United States Patent
Srinivasan et al.

(10) Patent No.: US 8,280,773 B2
(45) Date of Patent: Oct. 2, 2012

(54) METHOD AND APPARATUS FOR INTERNET CUSTOMER RETENTION

(75) Inventors: Kannan Srinivasan, Gibsonia, PA (US); Michael I. Shamos, Pittsburgh, PA (US)

(73) Assignee: Intellions, Inc., Mars, PA (US)

( * ) Notice: Subject to any disclaimer, the term of this patent is extended or adjusted under 35 U.S.C. 154(b) by 1219 days.

(21) Appl. No.: 09/804,728

(22) Filed: Mar. 13, 2001

(65) Prior Publication Data

US 2002/0046096 A1    Apr. 18, 2002

Related U.S. Application Data

(60) Provisional application No. 60/188,890, filed on Mar. 13, 2000.

(51) Int. Cl.
*G06Q 30/00*  (2012.01)
*G06Q 10/00*  (2012.01)

(52) U.S. Cl. .................. 705/14.73; 705/7.29; 705/7.33; 705/7.34

(58) Field of Classification Search .................... 705/14, 705/7

See application file for complete search history.

(56) References Cited

U.S. PATENT DOCUMENTS

| | | | |
|---|---|---|---|
| 6,286,005 B1* | 9/2001 | Cannon | 707/100 |
| 6,301,471 B1* | 10/2001 | Dahm et al. | 455/405 |
| 6,338,066 B1* | 1/2002 | Martin et al. | 707/10 |
| 6,400,996 B1* | 6/2002 | Hoffberg et al. | 700/83 |
| 6,430,539 B1* | 8/2002 | Lazarus et al. | 705/10 |
| 6,473,084 B1* | 10/2002 | Phillips et al. | 345/440 |
| 6,484,149 B1* | 11/2002 | Jammes et al. | 705/26 |
| 6,542,881 B1* | 4/2003 | Meidan et al. | 706/45 |
| 6,567,786 B1* | 5/2003 | Bibelnieks et al. | 705/14 |
| 6,691,106 B1* | 2/2004 | Sathyanarayan | 707/3 |
| 6,912,563 B1* | 6/2005 | Parker et al. | 709/204 |
| 2001/0014868 A1* | 8/2001 | Herz et al. | 705/14 |
| 2002/0002569 A1* | 1/2002 | Nguyen et al. | 707/515 |

\* cited by examiner

*Primary Examiner* — Yehdega Retta
(74) *Attorney, Agent, or Firm* — Ference & Associates LLC

(57) ABSTRACT

A method of dynamically optimizing customer retention for a web marketing site is provided. That method includes specifying a permissible defunct threshold, specifying a range of offers to be included in a set of promotions, determining a probability that a customer will become defunct in a predetermined period of time since the last interaction of that customer with the web site, and providing a promotion to a customer if the probability that the customer will become defunct in the predetermined period of time since the last interaction of that customer with the web site is greater than a predetermined threshold.

21 Claims, 4 Drawing Sheets

METHOD AND APPARATUS FOR INTERNET CUSTOMER RETENTION

CROSS-REFERENCE TO RELATED APPLICATIONS

This invention relates to U.S. Provisional Application No. 60/188,890, filed Mar. 13, 2000, which is incorporated herein by reference in its entirety.

FEDERALLY SPONSORED RESEARCH

Not Applicable.

BACKGROUND OF THE INVENTION

1. Field of the Invention

The disclosed invention relates to marketing goods and services over the Internet and, in particular, detecting through controlled experiments a rate of loss of customers based on waiting time or purchase frequency.

2. Description of the Background

The Internet is growing at a prodigious rate. According to current estimates the amount of information transmitted over the Internet is doubling approximately every 100 days. This makes it likely that visitors to websites will encounter congestion and possibly lengthy waiting times to obtain service. Customers who are impatient will balk (leave the website), possibly in favor of a competitive site. It is desirable, therefore, to detect impatient customers and ensure that they are served prior to leaving.

Marketing in the Internet is of a very different character than traditional marketing. Visiting a physical store requires an investment of time on the part of the customer, and there are costs associated with leaving the stores, including the time to locate an alternative store, travel to the alternative store, and develop a new buyer/seller relationship. On the Internet, each of these functions is only a click away, and a customer once lost may never be regained. Such traditional forces as geographic proximity, which draw customer to brick-and-mortar stores, are absent on the Internet.

It is known in queuing at airports, for example, to provide separate queues for first-class and coach passengers. The reason is to provide a benefit to those who pay higher airfares, not to prevent balking. It is also known to divide airplane passengers into groups for boarding so the rear of the plan can be filled first to simplify loading. Here the reason is not to prevent balking but to optimize the time required to prepare the plane for takeoff.

It is known in the art of Internet marketing to observe when an existing customer has failed to make a purchase within a certain period of time, after which it is assumed that the customer has been "lost" or has gone inactive. Efforts are then made to awaken or recapture the customer with promotions, email or other contact. By that time, however, the customer may be irretrievably gone and may be purchasing regularly from another source.

It is not taught or suggested in the prior art to observe the customer's behavior dynamically during his period of interaction with the website to anticipate a possible defection and take steps to prevent it. The present invention comprises a method and apparatus for detecting and forestalling a defection before it occurs, as opposed to attempting to recapture the customer after he has gone.

In addition, with traditional commerce, customer retention methods are typically static, with change only occurring with major market changes. This has resulted in part because the costs associated with establishing and printing advertisements and coupons. Furthermore, it is difficult to offer different promotions to different purchasers in a traditional setting in which promotions are published or made publicly available.

However, e-commerce does not have to be so restricted. The introduction of e-commerce on the Internet has made it easier for Internet merchants to change customer retention methods by simply updating a Web page, email coupon or appropriate database/systems. The costs associated with printing catalogs and marking goods in a bricks-and-mortar setting are typically not present in eCommerce. In addition, it is also possible to offer different promotions to different customers without either customer learning the price that has been offered to the other.

Although it is possible for Internet merchants to update promotional offers at any time, typically they have not done so. One reason for sticking to static customer retention strategies is that is the accepted marketing strategy. Merchants are accustomed to keeping promotional offers static for a significant period of time. Moreover, in some cases, merchants have both brick-and-mortar shops and web shops, and want to keep prices, promotions and customer other retention methods in alignment. However, the primary reason why Internet merchants do not dynamically adjust customer retention methods with the ever-changing marketplace is that the merchants do not have the ability to dynamically determine optimal promotional levels.

The Internet is a dynamic marketplace. As e-commerce becomes a dominant force, the ability to dynamically adjust to and exploit changes in the Internet marketplace becomes critical. An enormous amount of detailed, disaggregate information is being routinely captured during Internet transactions. The ability to gather real-time information on transactions conducted on the Internet means that Internet merchants could use the information to dynamically update their websites to take advantage of market conditions. In particular, the availability of real-time transaction information opens up the possibility of dynamic pricing and marketing.

However, using the information to determine the dynamic, optimal price or promotional level is problematic. Although a great deal of real-time transactional information is available, businesses have no current method of analyzing the information in a manner that provides guidance to dynamically update pricing, marketing, promotions and other key market variables.

As enterprises move into high velocity environments in a networked economy, decisions based on data are ever more critical and can be leveraged to affect the bottom line. In this environment, information is highly valuable but comes with a high discount rate. That is, the value of the information rapidly depreciates. Current generation data analysis, profiling, and data mining methods do not effectively deal with this type of information, as current methods rely on a time-consuming sequential process of data gathering, analysis, implementation and feedback.

Current systems, including data mining methodologies, are typically retrospective, creating a significant lag in analysis time. The dynamic nature of the Internet makes even recent information utilized in those methods obsolete.

Some efforts have been made to use computer systems to estimate supply and demand, to adjust prices to perceived market conditions, or to vary prices based on the identity and purchasing history of the customer.

U.S. Pat. No. 5,752,238 discloses a consumer-driven electronic information pricing mechanism including a pricing modulator and pricing interface contained with a client system. However, in this reference, the customer selects from a menu of pricing options. It does not disclose or teach a real-time determination of price sensitivities.

U.S. Pat. Nos. 5,822,736 and 5,987,425 disclose a variable margin pricing system and method that generates retail prices based on customer price sensitivity in which products are grouped into pools from a first pool for the most price sensitive products to a last pool for the least price sensitive products. However, the price sensitivities are determined manually by the storekeeper based on his subjective impressions and are not obtained in real-time.

U.S. Pat. No. 5,878,400 discloses a method and apparatus for computing a price to be offered to an organization based on the identity of the organization and the product sought, but does not teach or suggest real-time price determination.

U.S. Pat. No. 5,918,209 discloses a method and system for determining marginal values for perishable resources expiring at a future time, such as an airline seat, hotel room night, or rental car day for use in a perishable resource revenue management system. Data for the perishable resources and composite resources is loaded from the perishable resource revenue management system into the marginal value system. The marginal values for the perishable resources are determined using a continuous optimization function using interdependencies among the perishable resources and the composite resources in the internal data structures. However, this reference does not disclose or teach elicitation of price sensitivities based on measuring customer behavior.

U.S. Pat. No. 5,926,817 discloses a client-server system and method for providing real-time access to a variety of database systems, one application of which is "dynamic price quoting." However, the reference uses this phrase to mean computing a single price to be quoted to a customer based on information about the user's requirements and data contained in the supplier's databases. It does not teach or suggest experimentation to determine marketplace customer price sensitivity.

In general, the prior art teaches that it is useful to attempt to measure supply and demand as an aid in determining prices and promotional levels to retain customers. It is also known to utilize previously accumulated facts about a purchaser to influence the price or discounted price at which a particular product should be offered to him. However, the applicants are not aware of any prior art in which price, promotional level, and other market sensitivities are measured directly through use of controlled real-time experiments.

In view of the foregoing, it can be appreciated that a substantial need exists for a method and system for dynamically determining optimal promotional levels, promotional timing, and customer retention methods for products and services.

SUMMARY OF THE INVENTION

The inability to effectively exploit Internet transaction information is overcome by the method and system of the present invention, which enable Internet businesses to conduct real-time, online experiments on a sample of transactions and determine marketplace sensitivities. Analysis of the results of the experiments reveal optimal values of key market decision variables such as price, content of banner ads, promotion levels, quantity discount schemes, etc. The experiments may be automatically conducted on an on-going basis, or may be conducted on a periodic basis. The resulting optimal values may also be implemented automatically. The system offers total flexibility to the users to conduct and control the experiments. The experimental process is based upon rigorous statistical and econometric principles.

A manager using the method and system of the present invention can control the extent and speed with which market strategies are updated. The method and system of the present invention preferably allows managers to modify the nature of the experiment and the propagation of optimal values. Managers make the key business decisions, which are silently and seamlessly translated into the Internet merchant's eCommerce system.

For example, the profit-maximizing promotional offer determined from the dynamic experiment conducted by the system of the present invention might be 5% higher than the currently offered promotional offer. The manager might use this information for purely diagnostic purposes and thus gain insights into the price sensitivity of the market. Alternatively, the manager might automate the process of changing the offered promotion to the optimum promotion amount determined by the system of the present invention whenever the optimal profit for the promotion, for example, is 20% or more than current settings. In yet another embodiment, optimum promotional amounts may be may be constantly updated and implemented as the optimal amount changes. Thus, the method and system of the current invention can be used for a pure diagnostic purpose or to automate the setting of key market variables.

The dynamic experimentation used by the inventive system reveals the relative stability (or instability) of the networked market within which the business operates. The translation of an optimal value for a key variable (for example, promotional level or timing) to the entire market can be done on a real-time basis.

Continuous real-time modeling with appropriate integration to existing systems on critical factors like price, promotion, financing, content, discount schemes and product bundling give companies using the method and system of the present invention a huge competitive advantage.

The present invention includes a method of dynamically optimizing customer retention for a web marketing site is provided. That method includes specifying a permissible defunct threshold, specifying a range of offers to be included in a set of promotions, determining a probability that a customer will become defunct in a predetermined period of time since the last interaction of that customer with the web site, and providing a promotion to a customer if the probability that the customer will become defunct in the predetermined period of time since the last interaction of that customer with the web site is greater than a predetermined threshold.

With these and other advantages and features of the invention that will become apparent hereinafter, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the embodiments of the invention, examples of which are illustrated in the accompanying drawings. Wherever possible, the same reference numbers will be used throughout the drawings to refer to the same or like components.

It is worth noting that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 2:
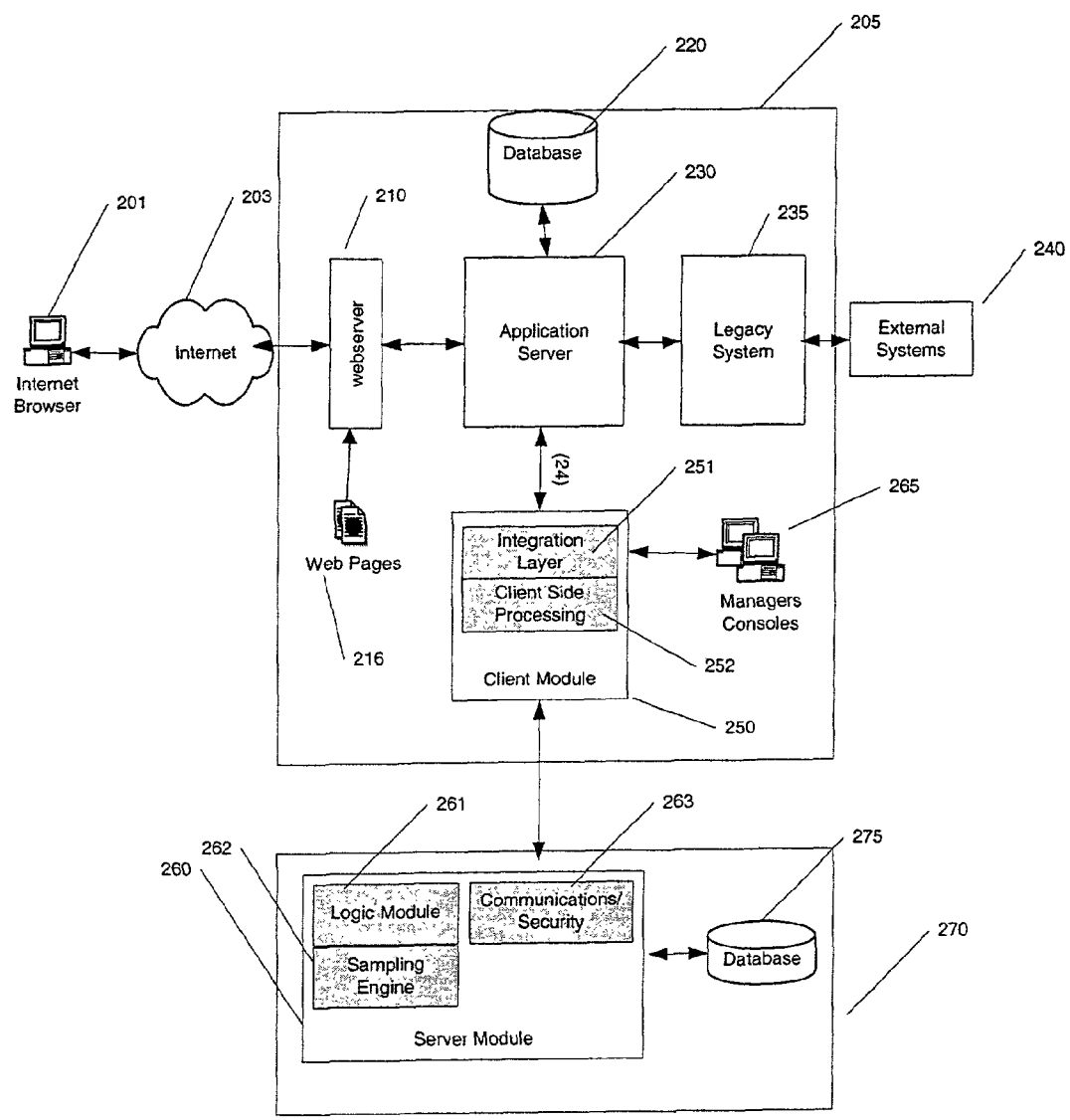
FIG. 2 illustrates one embodiment of a system architecture that may be used by the method and system of the present invention.

FIG. 2 illustrates one embodiment of a system architecture for the system of the present invention. In this embodiment, a potential customer visits a website run by an Internet merchant and conducts eCommerce by purchasing one or more products from the Internet merchant through the website.

In the embodiment shown, the customer uses an Internet browser 201 on his computer to access an eCommerce site operated by an Internet merchant. The Internet browser 201 may be any known to those skilled in the art, such as Microsoft Explorer or Netscape Communicator, for example. Preferably, HyperText Transfer Protocol (HTTP) or its more secure version HTTPS is used to communicate with the website. These are popular communication protocols used on the Internet to exchange information. Other communication protocols are known to those skilled in the art, and are intended to come within the scope of the present invention.

In an alternative embodiment not shown, the customer may be using a wireless handheld device to access the website.

Once the customer has accessed the eCommerce website, he can request information, such as current prices, from the website. The request sent by the browser might include information specific to the customer using the browser. Such information may include, for example, information derived from user logins, cookies stored on the user's machine and through the user's IP address.

The customer's browser 201 communicates with an Internet merchant's eCommerce system 205. The eCommerce system 205 is an integrated system that comprises different kinds of hardware and software sub-systems. The eCommerce system performs the functions needed to run the Internet merchant's Website.

Webservers are usually the entry point into an eCommerce system 205 from the perspective of a software program. The Webserver 210 on the eCommerce system is mainly responsible for delivering webpages to a browser across the Internet. Webpages are the pages that the user sees in the browser. The Webserver 210 runs software that receives and processes requests for webpages from users. The webpages may be stored as files on a storage disk that the Webserver reads and sends to the requesting browser. This is shown by 216. Alternatively, Webserver 210 may generate the webpage by gathering information from other sources, such as software programs, and then send it to the browser. For example, Webpages are often generated with data retrieved from an Application Server 230.

The Webserver 210 may be any type of known webserver, such as Microsoft IIS, or Netscape NES. The architecture shown in FIG. 2 also shows an optional database 220. The database may be used by the eCommerce system 205 to store Internet merchant information, such as customer account records. The database 220 may be any known database type, such as Oracle, Sybase, DB2, etc.

In addition, the Internet merchant may have one or more Legacy Systems 235. For example, all customer data may be stored on a Legacy System.

In many cases eCommerce systems interact with external systems, as shown by 240. For example, a trading exchange may receive catalogs from several external systems and store them in its own system. It may then present items from the catalogs to interested buyers. The eCommerce system 205 may communicate with external systems over the Internet or through a dedicated Frame Relay Circuit, or any other type of connection mechanism.

Because Webservers usually do not perform business logic data processing, the architecture typically includes an Application Server 230. The Application Server 230 may perform most business specific logic operations and send data to the Webserver, which processes the data and sends formatted output to the user for display. For example, the Application Server may retrieve a customer's bank account information, which is used as part of an Order Confirmation webpage generated by the Webserver.

Interprocess communications between the Application Server and the Webserver are typically supported by the underlying operating system. For example, for JAVA based platforms, the communication protocol may be RMI/IIOP (Remote Method Invocation/Internet Inter-ORB Protocol). The programs communicating via these methods may or may not reside on the same physical computer. Similar methods may be used for the communications between the Applications Server and the Client Module, which is described below.

Communications between a Legacy System and Application Server may be accomplished using commercially available software, such as IBM's MQ, Microsoft's MSMQ or Tibco software. The software used depends on the needs and the underlying operating systems.

The manager's console 265 contains software similar to browser software for displaying output from the inventive system to an employee of the Internet merchant, typically a management-level employee. It is used to manage the experiments run by the inventive system. It is used to configure experiments and display run-time progress data on the experiment. It may also be used to display data on past experiments.

The client module 250 of the present invention is integrated in the eCommerce system 205. Client Module 250 typically consists of an Integration Layer 251 and a Client Side Processing module 252. Collectively, it takes as input experiment parameter values and sends them to the Server Module 260 for processing. It receives output from the Server Module 260, and disseminates the output to the Application Server 230 and/or the Manager's Console 265 for display.

The Client Side Processing Module 252 is responsible for processing all the input received from the eCommerce System, typically through the Application Server 230, and delivering it to the Server Module 260. The input is typically a continuous stream of parameters used to conduct and manage an ongoing experiment. The Client Processing Module 252 establishes and maintains a secure communication channel with the Server Module and may also perform session management.

The Integration layer 251 helps the Client Side Processing module 252 run on a variety of systems. It acts as an interpreter between the eCommerce System and the Client Side Processing module 252. It may be different for different systems. This enables the Client Side Processing module 252 to remain the same, no matter what type of operating system is being used. In an alternative embodiment, the Client Side Processing module may be developed for a specific eCommerce system and runs without an Integration Layer.

Communications between the Client Module 250 and the Server Module 260 typically use HTTPS to ensure security. Data may also be transmitted in other formats including extensible Markup Language (XML) format.

The Dynamic Optimization System 270 includes sub-systems, computers and communications systems, including Server Module 260, that are used to perform the sampling and resultant analysis. It receives input data, performs statistical calculations and feeds the output to the eCommerce system 205. Typically, the output from the Dynamic Optimization System 270 is used by the Application Server 230 in performing the business specific logic.

Server Module 260 may contain Logic Module 261, Sampling Engine 262 and Communications Module 263. Server Module 260 is responsible for receiving input from Client Module 250, performing the experimentation and analysis, and outputting results to Client Module 250. These actions may all be performed in a secure environment.

Dynamic Sampling Engine 262 contains statistical functionality that may perform the various experiments described herein. Logic Module 261 contains the algorithms that are used to perform various types of analyses on the sampled data.

The Communications module 263 is responsible for securely communicating data to and from the Client Module.

Database 275 may be used to store historical data and other data regarding the experiments for processing, report generation and future retrieval.

The architecture shown in FIG. 2 is an ASP-based solution, where the Server Module 270 is hosted on a remote system with a network connection to the eCommerce system 205. In an alternative embodiment, the Dynamic Optimization System 270 may reside within the eCommerce system 205.

Figure 3:
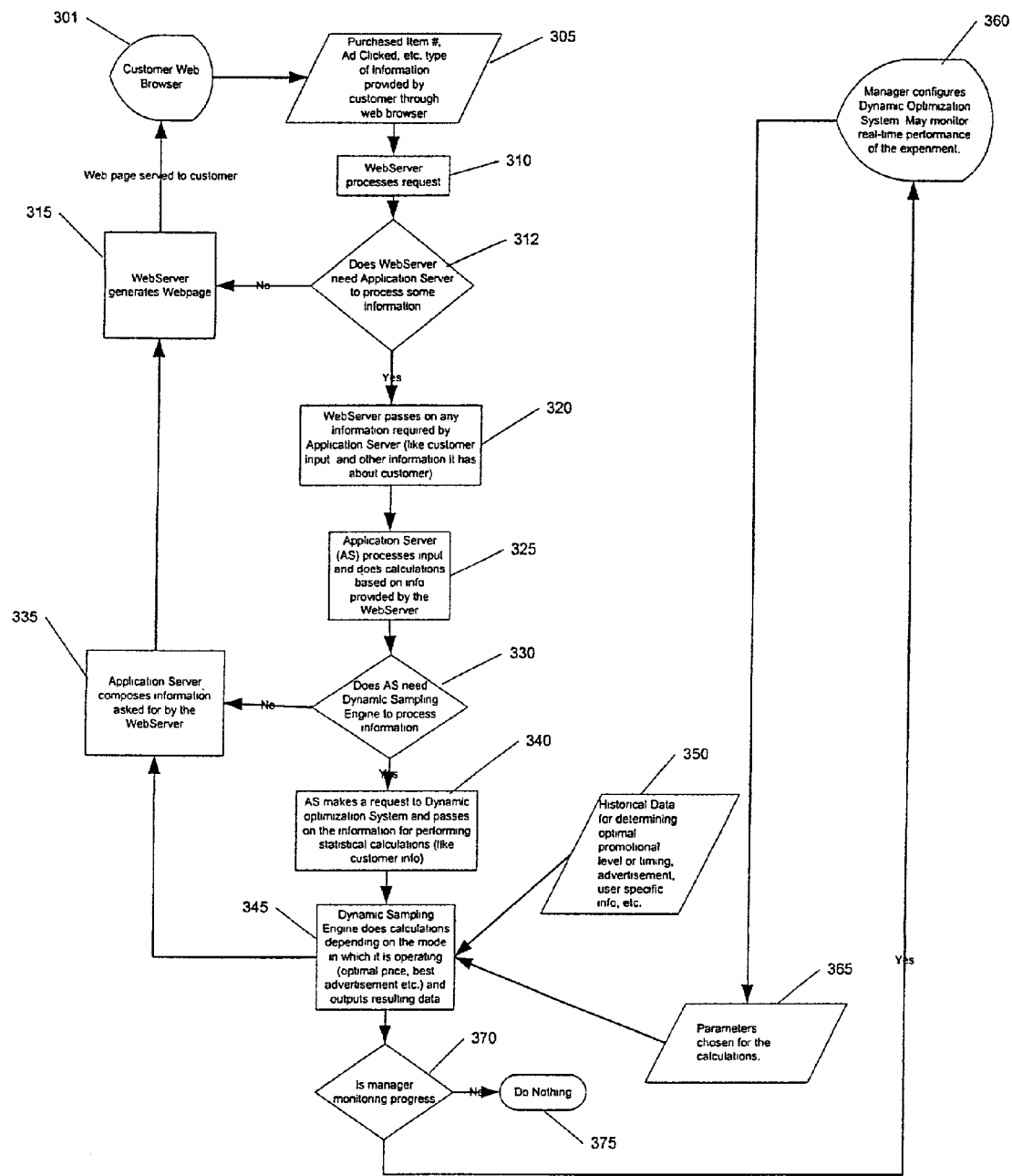
FIG. 3 illustrates one embodiment of a software system data flow in the method and system of the present invention.

FIG. 3 illustrates how data may flow through the inventive system. As shown by entity 360, an operator, who may be a management-level employee for the Internet merchant, using the inventive system configures the Dynamic Optimization System 270 by inputting parameters into the system. For example, the employee may enter a promotional offer range and number of samples to be used in the experiments. The employee may also actively monitor the performance of the experiment(s).

These parameters are used as input into the Dynamic Optimization System 270 as shown by data 365. These parameters thus configure the sampling engine subsystem of the Dynamic Optimization System 270.

As shown by entity 301, a customer uses a browser to access an eCommerce website. When the customer makes a request, several different types of data items may be sent to the Webserver, as shown by 305. The Webserver processes the information at step 310. If the request from the customer does not require Application Server processing, then the Webserver can go ahead and generate the appropriate Webpage, as shown by steps 312-315. However, if additional processing is needed, the Webserver will pass on information to the Application Server at step 320. Based on the information provided by the Webserver, the Application Server processes the input and performs any needed calculations at step 325.

During step 325, the Application Server will determine whether it needs the Dynamic Optimization System 270 to process data. For example, the Dynamic Optimization System 270 may process data when there is a current ongoing experiment to determine the optimal price, optimal advertising content, or optimal promotion level, etc.

If the Application Server does not need the Dynamic Optimization System 270 to process information, it composes the requested information using input from its own calculations, databases and/or legacy systems, as shown by steps 330-335.

Otherwise, the Application Server makes a request to the Dynamic Optimization System 270 and passes on any information required by the Dynamic Optimization System 270 for performing the statistical calculations, as shown by step 340.

The Dynamic Optimization System 270 may use historical data in its calculations as shown by data 350. In addition, the parameters 365 entered by the Internet Merchant are used in the calculations that the Dynamic Optimization System 270 performs.

The Dynamic Optimization System 270 performs the calculations as required, and outputs the resulting data at step 345. The Application Server composes the requested information at step 335 using the output from 345.

If the manager is actively monitoring the progress of the experiment, he will be informed of the progress as shown by steps 370-360.

The sampling engine 262 of the Dynamic Optimization System 270 may be used by many different applications to obtain information about current market conditions. These applications use the sampling data to determine optimal pricing, promotions level, promotion timing, product bundling, lead time discounts, quantity discounts, price versus financing and type and content of banner ads, for example. The Logic Module contains the algorithms to perform the different types of analyses required by different applications. Other applications of the sampling data will be known to those skilled in the art and are intended to come within the scope of the present invention.

Figure 1:
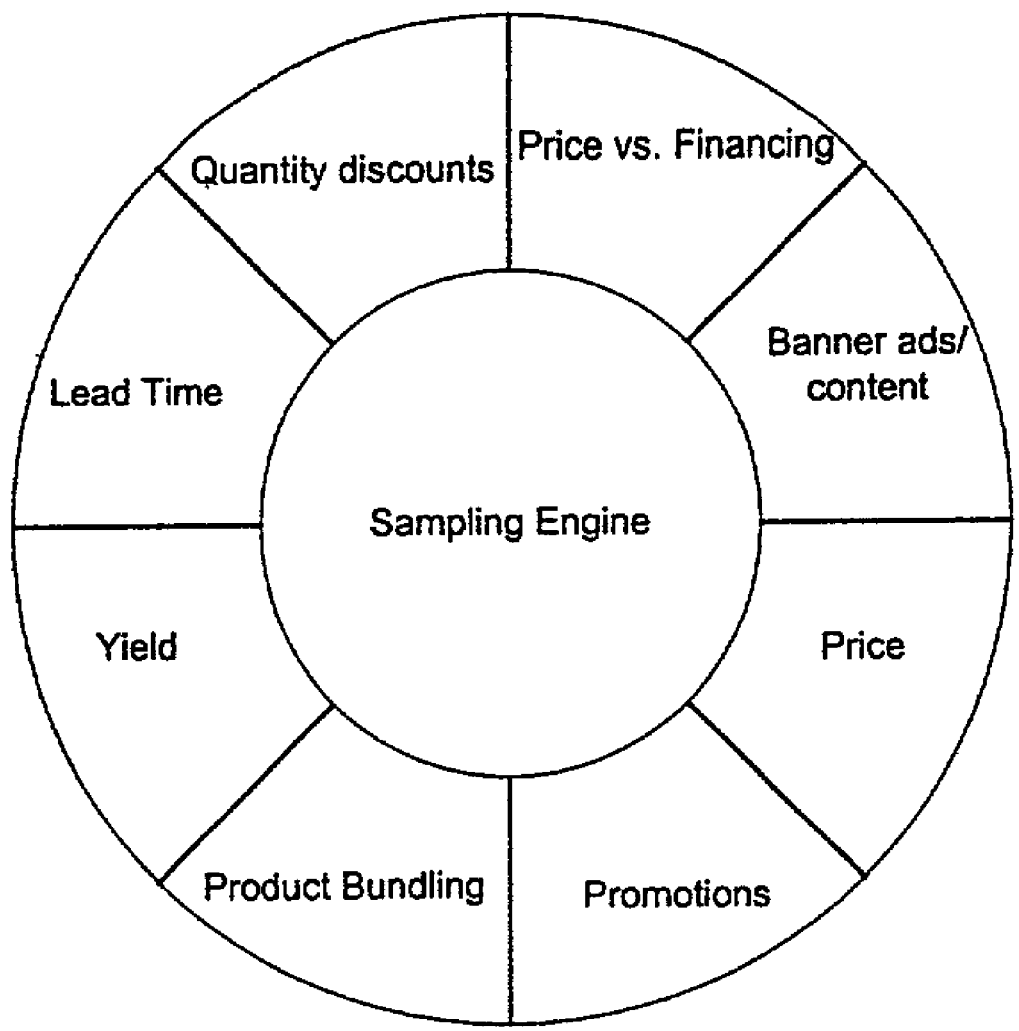
FIG. 1 is a diagram illustrating the relationship between the sampling engine of the present invention and various applications that use the sampling engine.

The dynamic sampling engine may be considered the core of the inventive system. As shown by FIG. 1, it can be translated into modules for pricing, promotions, product bundling, yield management, lead time discounts, quantity discounts, price versus financing and banner advertisement content.

A promotion module is described below.

Dynamic Promotion to Mitigate Customer Defection or Attrition

It is easy to change eCommerce promotions by simply updating a Web page. In addition, it is possible to present different promotions to different online customers without either customer learning the promotion that has been offered to the other. This may be accomplished by presenting different levels of promotion to different potential customers, for example. Because of these reasons, it is possible to perform controlled, real-time experiments on samples of the customer population to determine customer promotion sensitivities. This information can then be used to determine real-time optimal promotion strategies for an entire customer population or for selected segments of the customer population. In addition, merchants may learn from the online experiments, and apply this learning to offline counterpart market strategies.

The sampling experiments conducted by the method and system of the present invention are designed to measure different customer inclinations. For example, one area of measurement may be to measure customer inclination to purchase a product at differing promotional levels. In this application, the amount of the promotion is deliberately varied by the inventive system during a sampling period, and statistics are kept by the system to determine what percentage of customers are likely to buy or exhibit interest in the product at the different promotional levels. The statistics typically include, for example, the number of customers who actually purchased the product at each promotional level.

Given the percentage of customers who buy, or who exhibit a quantifiable interest in, the product at each promotional level, the system is able to compute an optimal or near-optimal promotional level for the product. The optimal promotional level determined by the system is intended to optimize an economic variable, such as customer retention or profit. The economic variable to be optimized may be financial, such as profit or revenue. Alternatively, the economic variable may be another quantity of interest, such as market share, customer satisfaction, customer retention at the website, or utilization of manufacturing or shipping resources, for example. The optimization typically determines the promotion at which an economic variable is maximized, although other types of optimization, such as minimizing an economic variable, are possible using the method and system of the present invention.

In one embodiment, the objective function may weigh multiple criterions. For example, the user may be trying to optimize both profit and market share. The objective function may be defined to be 75% weighted toward profit optimization and 25% toward customer retention. The inventive system in this case will determine which price optimizes this weighted multi-criterion function.

The dynamic promotional level application allows companies to determine optimal promotional level by running continuous real-time models on an appropriate sample population, which may be determined automatically by the sampling engine.

The present invention operates on the concept that the likelihood that a customer will return to a website decreases as the elapsed time from the last access of that website by that customer increases. Thus, the present invention includes a method and system of determining the likelihood that a customer will not return to a website and a method and system of providing an incentive to that customer to return to the website.

To determine the likelihood that a customer will not return to a website based on the length of time since that customer last accessed or transacted with the site, the present invention may perform a statistical analysis of past customer access frequency and the likelihood of retaining those customers based on that access frequency. Managers of the firm may explicitly state a time interval by which if a customer had failed to interact with the site, the customer is deemed to be defunct, wherein "defunct" indicates that the client is not expected to return to the web site. The term "interaction" may be defined as a visit to the site or purchase of an item or service from the site. (Based on historical data, the probability of defection conditional on lapsed time since last interaction can be calculated by determining the percentage of customers that return to the site after having no interaction with the site for a selected time period.) Typically the probability that a customer will return decreases as the lapse time increases.

In an example where a web merchant considers any customer who has not interacted with the site for six or more months to be defunct. Based on historical data, the probability that a customer becomes defunct when the customer has not interacted for one month may be, for example, 0.3. The probability of the customer becoming defunct rises to 0.6 by the end of three months.

Furthermore in this example, the merchant may select that when a probability of the customer becoming defunct is equal to 0.6, a threshold has been surpassed. Henceforth, that threshold will be referred to as a "critical threshold." Thus, the merchant may decide that when the likelihood of a customer not returning to interact with the site exceeds a 0.6 likelihood, the merchant will take steps to retain that customer rather than permit the customer to become defunct. When a customer, therefore, has not interacted with the web site for a period of time corresponding to the time when historically only 0.6, or 60% of customers will return to interact with the web site, the merchant may offer a promotion to the customer to attract the customer back to the site to interact.

In a certain embodiment of the present invention, a method of providing an incentive to that customer to return to the website is provided. That method uses the critical threshold, which may have been determined by a user, and the defunct probability obtained through the previously described analysis of historical data. The method minimizes the cost of customer retention.

In one embodiment of the present invention, a customer that has not accessed the site within the defunct threshold period is proactively sought out and provided with an incentive to access the site and make a purchase therefrom. In that embodiment, the customer may be provided an electronic coupon by way, for example, of an email inviting the customer to accept a discount on a purchase made by the customer. Like any coupon, the electronic coupon may be redeemable only for selected goods or services and may be valid for a limited period of time.

In a certain embodiment of the present invention, the promotion level, or amount of discount offered in a coupon is sampled. Such sampling may be conducted by offering different amounts of discounts to various random samples of customers whose defunct probability exceeds the thresholds. For example, managers may consider a promotional discount from six to eight dollars for all customers with a defunct probability of 0.6 or higher. Sampling increments may then be determined. For example, if a sampling increment of one dollar is desired, discounts of six dollars, seven dollars, and eight dollars may be offered to three random samples of customers exceeding the threshold. Alternately, if a sampling increment of fifty cents is desired, discounts of six dollars, six dollars and fifty cents, seven dollars, seven dollars and fifty cents, and eight dollars may be offered to five different groups of customers.

The size of the random sample is determined based on the manager's levels of confidence intervals. These methods are known to those skilled in the art. Furthermore, the following statistical references are incorporated by reference in their entirety: (a) Ross (1997), A First Course in Probability, Prentice Hall, Upper Saddle River, N.J.; (b) Gelman A., J. B. Carlin, H. S. Stern and D. B. Rubin (1995), Bayesian Data Analysis, Chapman & Hall, New York, N.Y.; (c) Malhotra, N. K. (1993), Marketing Research, Prentice Hall, Englewood Cliffs, N.J.; (d) Wedel, M and W. A. Kamakura (1998), Market Segmentation: Conceptual and Methodological Foundations, Kluwer Academic Publishers, Boston, Mass.; (e) Pudney (1989), Modeling Individual Choice: The Econometrics of Corners, Kinks and Holes, Basil Blackwell Limited, Oxford, United Kingdom; (f) Cinclair E. (1975), Introduction to Stochastic Processes, Prentice-Hall, Englewood Cliffs, N.J.; (g) Kalbfleisch, J. D. and R. L. Prentice, The Statistical Analysis of Failure Time Data, John Wiley & Sons, New York, N.Y.; and (h) Mitchell, T. M (1997), Machine Learning, McGraw-Hill, New York, N.Y. Those references describe statistical methods that may be utilized by the present invention.

Figure 4:
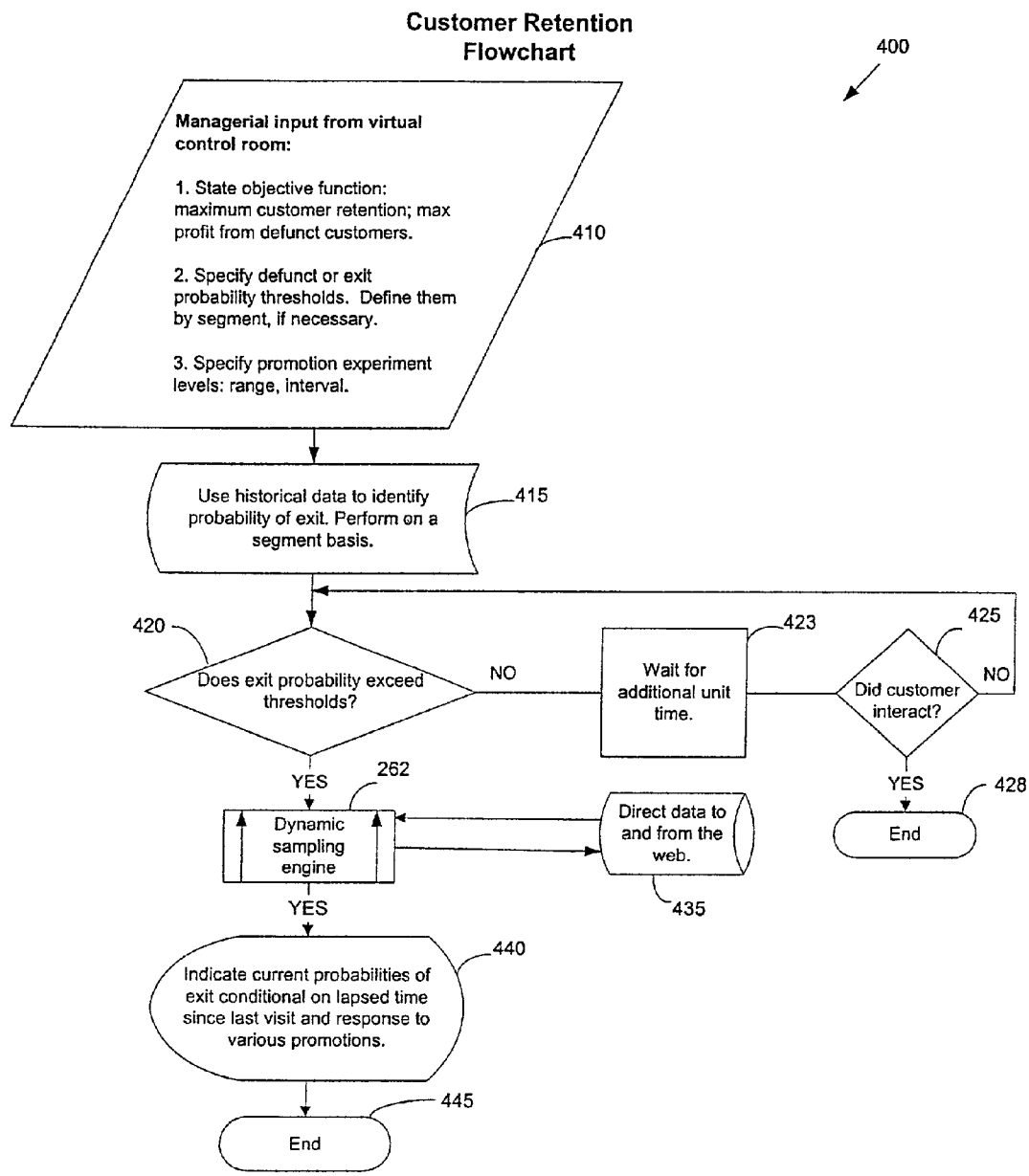
FIG. 4 is a flowchart illustrating the process used to perform dynamic customer retention by the method and system of the present invention.

FIG. 4 illustrates a method of optimizing customer retention. At 410, the operator of the present invention determines whether he is interested in maximizing customer retention or maximizing profit by providing customers who are likely to become defunct with an incentive, such as a promotion, to return to interact with the web site. The operator specifies a permissible defunct threshold over which the loss of customers is unacceptably high. The operator may define defunct thresholds by segment where necessary. For example, the acceptable defunct threshold for customers purchasing more than $1000 from the site in the past may be lower than the acceptable defunct threshold for customers purchasing more than $50 from the site in the past. Thus, the sample may be divided by segments having different defunct thresholds. The operator will also specify the level, range and interval of the promotion to be offered for each segment.

At 415, the operator uses historical data to identify the probability that a customer will become defunct, or exit as a customer, for each segment to be sampled at a particular time since the customer last interacted with the site.

At 420, the operator determines whether the probability that an existing customer or group of customers will become defunct exceeds the desired defunct threshold based on the amount of time that has lapsed since their last interaction with the site. If the probability that the customer or group of customers are likely to have become defunct does not exceed the defunct threshold, then the present invention will wait an additional period of time at 423 and save data related to whether those customers interact with the web site during that time period at 425. If a customer does interact during that time, then there is no need to provide an incentive for that customer to return. Thus, the system will drop a customer who returns to interact from that sample at 428. That customer may be included in future iterations of the present invention; however, the time since last interaction will begin to toll once again from the most recent interaction time.

When a customer does not return to the site after the additional waiting period, the present invention will once again determine the likelihood that the customer will not return at 415.

When the defunct threshold is exceeded at 420, that customer may be passed to the dynamic sampling engine 262 described hereinbefore for a determination of the optimum promotional level to be offered. Experimentation utilizing the dynamic sampling engine 262 may be repeated periodically to ensure that the optimal promotion is dynamically optimized to regularly compensate for market changes. Thus, experiments utilizing the dynamic sampling engine 262 may be run monthly, weekly, daily, hourly, or more often, until the experimentation becomes, practically speaking, continuous. Dynamic optimization, therefore, is a result of continuous experimentation. The optimum promotion may, furthermore, be propagated to the web at 435 for offering to customers each time a new optimum promotion level is discovered by the dynamic sampling engine. Alternately either the system or the operator may propagate the optimum promotion each time the optimum promotion level changes by a particular amount from the previous promotion level such as, for example, $0.25. Data from the web 432, such as purchase, timing, and use of promotions by customers may also be provided from the web 435 to the dynamic sampling engine for use in future samples.

The result of the experimentation performed by the dynamic sampling engine is an indication of the current probability that a customer will exit the site and not return to the site conditioned on the lapse time since the last interaction by the customer and the amount of the promotion offered at 440.

At 445, the process 400 ends, however, the process 400 may be repeated at regular intervals.

As an example of the operation of the dynamic sampling engine, let "$CPR_j$" be the Cost of Promotion for product j ("$PR_j$"). Let the random sample for each promotion be a constant "m". Let "$f_j$" be the fraction of sample customers who accept the promotion in the defined time and interact with the site. Let "V" be the lifetime value or expected profit to be made from the returning customer calculated from historical data. Based on the experimental information, the objective is to maximize profit which may be defined by the equation: Maximum Profit for Product $PR_j$ is equal to the number of customers sampled times the fraction of customers who accept the promotion times the difference between the normal profit made from the product less the profit lost through the promotion or $mf_j(PR_j-CPR_j)$.

It is noted that the profit lost through the promotion may not be the entire amount offered but, rather, may be equal to the ratio of cost to sales price. Thus, a promotion of $8 will include a lost profit of $6.40 where cost of the product is 80% of the sales price.

Taking a specific example, consider promotions of six, seven and eight dollars. The costs of the promotions to the firms are $4.8, $5.6 and $6.4, respectively. Given the constant sample size of 1000 for each promotion, the experiment reveals that 0.3, 0.4 and 0.41 fractions of the samples respond to the promotions. The lifetime value or profit of a returning customer is $25 which has been obtained from historical data. Therefore, the profit for various promotions are as follows: the profit of a promotion of $6=(1000×0.3×[25−4.8])=$6060, the profit of a promotion of $7=1000×0.4×[25−5.6]=$7760; and the profit of a promotion of $8=1000×0.41[25−6.4]=7626, therefore, the optimal promotion is at the $7 level because that level offers the highest profit.

The Internet merchant may also determine the customer population. In one embodiment, the population may include every potential customer that visits the web site. Alternatively, the customer population may be clustered or segmented, and only customers who meet a certain profile are sampled. As an example, customers may be clustered into socioeconomic groups, and only customers in certain groups are sampled when determining an optimal price. Alternatively, the entire customer population may be segmented, with separate experiments run on each segment determining an optimal price for each segment. As another example, customers may be identified for sampling based upon purchasing history or other accumulated data. For example, the segmentation scheme may cluster customers based on purchase history: heavy buyers, light buyers and non-buyers. Segments may be determined from a combination of demographic variables and prior purchase histories.

The result of utilizing that method is a determination of how long to wait before offering a discount in order to retain a customer and what the optimal promotional offer is.

The representative may then input promotion amounts to be sampled. Those sample promotion amounts typically include the current promotion amount being offered, and a number of specified optional promotion amounts both above and below the current promotion amount. Preferably, a sufficiently large number of promotion amount points are tested so that there are enough promotion amount points to determine a smooth curve in the profit function. In an alternative embodiment, the representative may enter a range of promotional amounts to be sampled, and sampling intervals and the system may determine individual promotional amounts to be sampled in that range at specified intervals. The optimal promotion may be automatically propagated to the entire population of customers who exceed the defunct probability.

The option should clearly state the objective function. The objective function, for example, can be maximized customer attention or, as in the numerical example we presented hereinbefore, it could be maximum profit from defunct customers. It is also important for the managers to specify the exit-probability thresholds. For example, they might determine that if the threshold probability is 0.3, that means that any time the probability of defunct exceeds 0.3, they should immediately adopt more promotions so that they can pull the defunct customers back and attract them to the site.

The probabilities might furthermore change by the segments. For example, large important customers might have thresholds of 0.3, while less important people who buy less could have a threshold of 0.5. Thus, the operator maybe willing to accept a higher probability of exit with customers who buy less because these customers are not so important. The threshold could be based on purchase history, that is somebody that bought a lot in the past is more important and the operator may wish to accept a threshold of 0.3. Others buy less, so the operator may be willing to accept a high threshold of 0.5. Another sample could be based on pure segmentation. For example, high-income customers may be important because they are potentially highly profitable, therefore, operators accept a very low threshold of their exit. An operator may specify this for each segment if they are doing a segment basis analysis. The third item that they may specify is the range of promotion, which in this example, will be $6 through $8. Next, the operator will determine the intervals. Those intervals may, for example, be in $1 increments such that the samples would include $6, $7, and $8. Alternately, the intervals may be in $0.5 increments providing samples of $6, $6.50, $7, $7.50 and, $8. They may also specify the desired levels of confidence intervals. The next step is to use the historical data to identify the probability of exit or the probability of a customer becoming defunct and not returning to the site. That may be done on a segment-by-segment basis based on the historical data. For example, for a given customer at a point in time, a determination may be made as to whether the exit or defunct probability exceeds the desired threshold. Again, taking the example of a customer for whom the defunct probability is 0.3, if that is the threshold and it has reached 0.3, then we move on to perform dynamic sampling. Dynamic sampling is the process by which various promotions are offered to various subsamples of customers as we denoted in the previous experimental example. We may also find the optimum promotion based on maximizing the profit from defunct customers. In the interactive site given to the operators, we show what the historical probabilities of exit that we have calculated are and then we indicate what fraction of customers respond to various promotions and how the profit changes at various promotion levels indicating what the optimal profit is. The optimal promotion may then be automatically propagated to the website. Suppose the probability does not exceed the threshold so we would wait for one more unit period of time. There is a possibility that the customer could have been interacted at that point of time because we are waiting for an additional amount of time. We may then ask whether the customer interacted. If the customer has interacted, we know the customer has returned and we will not have to worry about that customer. If the customer did not interact, then we have to again go back and ask what is the probability of that customer being defunct now and return to a determination of whether the threshold has been exceeded.

In another embodiment, the present invention monitors the Internet interaction between a selling organization and its customers based on a variety of indicators of performance. These indicators are used to predict when the buyer/seller relationship is degrading and a defection of the customer has become more likely so the seller may take measures to prevent such defection.

The present invention comprises a computer system that collects data about customers who leave a website prior to obtaining service in an effort to develop a profile of such customers so that later customers who visit the site and conform to the profile can be served more quickly. Such favored treatment is possible on the Internet because the various individuals who are waiting for service at a website are unknown and invisible to one another. In a real physical store it would be undesirable to serve customers out of the order in which they arrived because of the risk of offending customers not so chosen.

The quality of a buyer/seller relationship can be measured in many ways, some of which are specific to particular industries. For example, the rate at which a customer places orders, either in number of orders per month or dollar volume per month, is such an indication. A customer whose purchases are tailing off may have become dissatisfied with the goods or the supplier and may cease purchasing altogether in the future. A customer whose rate of purchasing is tailing off may likewise be considering defection. In some cases more subtle information may have to be considered. An increase in the volume of complaints about product quality from the same customer may suggest that the relationship is troubled.

In many cases, the supplier has the ability to retain the customer prior to defection if the potential for defection is noted and the cause can be determined. The supplier may then take steps to preserve the relationship. In the Internet world, however, the number of customers may be huge (millions or tens of millions) and the average order may be small (tens of dollars). It is impractical to have human beings monitor such a large number of interactions on an individual basis. This process must be automated.

The present invention monitors variables believed by the seller to be indicative of potential defection, performs statistical analysis to determine whether the observed variables are within normal statistical variance or suggest potential defection, and alerts the seller of such a possibility.

The invention initially performs sampling to gauge the impatience or tendency to balk over time, of the space of visitors and segments them by chosen variables. For example, visitors deemed to be wealthy may be more impatient than other visitors, but can be expected to spend more money at a site. Once a visitor is known to be wealthy, by being identified or by having his worth inferred, his impatience can be estimated from the statistical model built by the invention.

When subsequent visitors arrive at the site, estimates of their impatience or the expected profit to be obtained from them as the service time increases can be estimated. The assignment of customers to queues and their ordering within queues can be adjusted to maximize an objective function.

Various different objective functions may be used. One is to minimize the number of visitors who will balk. By estimating the expected service time necessary to serve a particular impatient visitor, it is possible to estimate the number of queued visitors who will leave the site prior to being served. If the impatience of the fourth visitor in the queue is known, then the probability that the fourth visitor will balk can be computed.

For example, the time between logins ("inter-login time") is a random variable thought to be closely related to defection. In fact, an infinite inter-login time is the very indicator of a permanent defection. However, even a dedicated regular customer may exhibit significant variance in inter-login times due to vacations, business seasonality, short-term concerns, and the like. It is unrealistic to treat every rise in inter-login time as a potential defection. What is important is how the recent distribution and sequence of inter-login times compares to the previous or expected behavior of the customer.

The method of the present invention comprises:
1. Collecting information about visitors to a website, including information about the length of time said visitors remain at the site without receiving service.
2. Segmenting said visitors by impatience.
3. In a website that maintains service queues, determine of each visitor a degree of impatience based on a segment to which he belongs.
4. In said website, assign said visitor to a service queue and to a suitable position within said queue to maximize a given objective function.

In an improvement of the present invention, a visitor who is about to be forced to wait beyond the time when he can be expected to balk may automatically be offered a premium, such as a discount on a product or a credit toward future purchases, in return for his willingness to remain in the queue.

The visitor segmentation and estimates produced by the data can be subjected to constant dynamic update based on actual measurements of balking time.

It is in general not possible to determine when a visitor "leaves" a website. This is a result of the stateless nature of the Hypertext Transfer Protocol (HTML—Hypertext Mark-up Language) used to request and deliver web pages, under which there is no direct connection between the visitor and the site. The visitor occasionally requests a web page and the site delivers it. What the user is doing between requests is not known to the site. Therefore, it is not a well-defined event for a user to "leave."

For the purposes of the present invention, a visitor will be deemed to have "left" a website when he has failed to request a new page or has not sent data to the site for a defined period of time. Said time period may be set by the user of the invention.

The problem of determining when a visitor leaves a site will become easier with subsequent engineering changes to the Internet. Later versions of the Internet Protocol will establish an express link between client and server that will facilitate determining when a visitor has "left" a website.

It is possible to trap and foil efforts to leave a website in favor of another. The visitor can then be required to click a virtual button to indicate that he wants to exit the site, which will give a positive indication of such an event. Even with this expedient, however, it is not possible to detect when the user has moved to another window on a computer display or whether he is simply absent from the room in which the computer is located. To do this one may combine the technique of forcing an express exit click and measuring the time between clicks to infer whether a visitor has "exited."

In a preferred embodiment, an Internet computer system for interacting with customers (e.g. a web server serving content and affording an opportunity to place orders) already exists. The present invention is used as add-on software that connects to the pre-existing system to monitor interactions.

In a further embodiment, the system is provided with training data (either in advance or as the system is being used) indicating whether a particular customer in fact defected. The system can then use prior art methods, such as neural networks, to train the system to recognize patterns similar to those in the training data and thereby sharpen its predicative ability.

In said embodiment, the computer method of the present invention is as follows:
1. Provide the system with training data indicating previous defections and the values of the indicator variables for each such case.
2. Train the system on the training data to predict probability of next purchase and probability of defection based on the time sequence of indicator variables.
3. Observe the indicator variable for each identified customer in real-time.
4. If the defection probability is outside control levels, alert the seller to the possibility of defection.

In a further embodiment, automatic remedial action may be taken when the defection probability exceeds a defined level. For example, the customer may be offered a discount or other promotion, or email may be sent. This can be done without human intervention or involvement. The effectiveness of the automated methods may themselves be monitored and the parameters altered dynamically based on actual experience.

In a further embodiment, the customers are segmented via clustering techniques into groups whose correlation between indicator variables and defections are similar. The system then attempts to categorize each customer by the segment to which it belongs. In this manner the defection characteristics of the segmented group can be used to predict defection by an individual, in the absence of detailed information about a specific customer. Segmentation may be done by past purchase history, payment history, geographic location, socio-economic status, or any other method that results in meaningful clusters.

In a further embodiment, the seller is provided with a graphic interface for real-time monitoring of its web activities, impending defections (either on a case-by-case or aggregated statistical basis), and effectiveness of defection countermeasures.

It is a benefit of the present invention that Internet customer defection can be detected without human intervention or attention.

It is a benefit of the present invention that the impatient behavior of visitors to a website can be elicited through experimental sampling.

It is a benefit of the present invention that the general level of satisfaction of visitors to a website can be increased by reducing the time required to service impatient individuals but without the need to reduce average service times.

It is a benefit of the present invention that managers can be provided with actual data concerning the impatient behavior of website visitors.

It is a further benefit of the present invention that measurement of impatience and resulting queuing adjustments can be made continuously and, therefore, a website can respond to changing usage and visitor population patterns.

It is a further benefit of the invention that detected Internet customer defections can be prevented without human intervention or attention.

It should be apparent that references to the Internet only comprise a subset of the potential embodiments of the present invention and that all that is required is some means for monitoring the relevant variable indicative of defection so that potential defections can be anticipated and dealt with. Said monitoring means may include, but are not limited to, private leased networks, local area networks, wide area networks, cable television systems, cellular telephone systems, wireless communication systems, infrared systems, and satellite systems.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computer implemented method of dynamically optimizing customer retention for a web marketing site, comprising:
   operating a computer processor and memory for:
   specifying a permissible defunct threshold representing a probability that a particular customer is not expected to return to the web marketing site, wherein the permissible defunct threshold is set according to an inter-login time of a customer at the web marketing site; and
   responsive to the particular customer not interacting with the web marketing site for a period of time, determining a probability that the particular customer will become defunct based on historical data stored in a database indicating a percentage of customers that have returned to the web marketing site after having no interaction with the web marketing site for the period of time; and
   determining that the particular customer has exceeded the defunct threshold;
   sampling defunct customers to determine a promotion to offer the particular customer; and
   propagating the promotion to the particular customer.

2. The method according to claim 1, wherein the promotion is automatically propagated to the web marketing site.

3. The method according to claim 1, wherein the promotion comprises a discount on a product that maximizes customer retention.

4. The method according to claim 1, wherein the promotion comprises a discount on a product that maximizes profit.

5. The method according to claim 1, wherein the sampling further comprises:
   segmenting the defunct customers into socioeconomic groups; and
   only sampling customers belonging to certain socioeconomic groups.

6. The method according to claim 1, wherein the promotion comprises a discount on a product that maximizes customer retention.

7. The method according to claim 6, wherein:
   a permissible defunct threshold for customers that have previously spent more than $1000 is set lower than a permissible defunct threshold for customers that previously spent more than $50; and
   the promotion is propagated to the web marketing site for offering to subsequent customers each time the promotion changes by a particular amount, as discovered via sampling, the particular amount comprising $0.25.

8. A computer implemented method of dynamically optimizing customer retention for a web marketing site, comprising:
   operating a computer processor and memory for:
   specifying a permissible defunct threshold representing a probability that a particular customer is not expected to return to the web marketing site, wherein the permissible defunct threshold is set lower for customers predetermined to be important customers; and
   responsive to the particular customer not interacting with the web marketing site for a period of time, determining a probability that the particular customer will become defunct based on historical data stored in a database indicating a percentage of customers that have returned to the web marketing site after having no interaction with the web marketing site for the period of time; and
   determining that the particular customer has exceeded the defunct threshold;
   sampling defunct customers to determine a promotion to offer the particular customer; and
   propagating the promotion to the particular customer.

9. The method according to claim 8, wherein the promotion is automatically propagated to the web marketing site.

10. The method according to claim 8, wherein the promotion comprises a discount on a product that maximizes customer retention.

11. The method according to claim 8, wherein the promotion comprises a discount on a product that maximizes profit.

12. The method according to claim 8, wherein the sampling further comprises:
    segmenting the defunct customers into socioeconomic groups; and
    only sampling customers belonging to certain socioeconomic groups.

13. The method according to claim 10, wherein:
    a permissible defunct threshold for customers that have previously spent more than $1000 is set lower than a permissible defunct threshold for customers that previously spent more than $50; and
    the promotion is propagated to the web marketing site for offering to subsequent customers each time the promotion changes by a particular amount, as discovered via sampling, the particular amount comprising $0.25.

14. A computer implemented method of dynamically optimizing customer retention for a web marketing site, comprising:
    operating a computer processor and memory for:
    specifying a permissible defunct threshold representing a probability that a particular customer is not expected to return to the web marketing site; and
    responsive to the particular customer not interacting with the web marketing site for a period of time, determining a probability that the particular customer will become defunct based on historical data stored in a database indicating a percentage of customers that have returned to the web marketing site after having no interaction with the web marketing site for the period of time; and
    determining that the particular customer has exceeded the defunct threshold;
    sampling defunct customers to determine a promotion to offer the particular customer, wherein the sampling further comprises: segmenting the defunct customers into socioeconomic groups; and only sampling customers belonging to certain socioeconomic groups; and
    propagating the promotion to the particular customer.

15. The method according to claim 14, wherein the promotion is automatically propagated to the web marketing site.

16. The method according to claim 14, wherein the permissible defunct threshold is set according to an inter-login time of a customer at the web marketing site.

17. The method according to claim 14, wherein the promotion comprises a discount on a product that maximizes customer retention.

18. The method according to claim 14, wherein the promotion comprises a discount on a product that maximizes profit.

19. The method according to claim 14, wherein the permissible defunct threshold is set lower for customers predetermined to be important customers.

20. The method according to claim 14, wherein the promotion comprises a discount on a product that maximizes customer retention.

21. The method according to claim 20, wherein:
a permissible defunct threshold for customers that have previously spent more than $1000 is set lower than a permissible defunct threshold for customers that previously spent more than $50; and
the promotion is propagated to the web marketing site for offering to subsequent customers each time the promotion changes by a particular amount, as discovered via sampling, the particular amount comprising $0.25.

* * * * *